(12) United States Patent
Durocher et al.

(10) Patent No.: US 12,516,609 B2
(45) Date of Patent: Jan. 6, 2026

(54) SERVICEABLE PROPELLER SHAFT ZERO AIR GAP SEAL

(71) Applicant: Pratt & Whitney Canada Corp., Longueuil (CA)

(72) Inventors: Eric S. Durocher, Boucherville (CA); Herve Turcotte, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/743,690

(22) Filed: Jun. 14, 2024

(65) Prior Publication Data

US 2025/0382892 A1   Dec. 18, 2025

(51) Int. Cl.
*F01D 11/00*   (2006.01)

(52) U.S. Cl.
CPC .......... *F01D 11/005* (2013.01); *F01D 11/003* (2013.01); *F05D 2240/50* (2013.01); *F05D 2240/70* (2013.01)

(58) Field of Classification Search
CPC ...... F01D 11/003; F01D 11/005; F01D 11/04; F01D 11/12; F05D 2240/50; F05D 2240/70; F16J 15/442; F16J 15/447; F16J 15/3448
See application file for complete search history.

(56) References Cited

U.S. PATENT DOCUMENTS

| | | | |
|---|---|---|---|
| 4,486,024 A * | 12/1984 | Cooper | F16J 15/40 277/927 |
| 4,815,748 A * | 3/1989 | Schubert | F16J 15/441 277/927 |
| 5,301,957 A | 4/1994 | Hwang et al. | |
| 6,843,482 B1 | 1/2005 | Bayne | |
| 7,334,982 B2 | 2/2008 | Singh et al. | |
| 9,359,912 B2 | 6/2016 | Ullah et al. | |
| 2002/0140176 A1 | 10/2002 | Tong | |
| 2006/0239816 A1 | 10/2006 | Labbe et al. | |

(Continued)

FOREIGN PATENT DOCUMENTS

| | | |
|---|---|---|
| CN | 213800130 U | 7/2021 |
| EP | 3865741 A1 | 8/2021 |
| WO | 2024043212 A1 | 2/2024 |

OTHER PUBLICATIONS

Extended European Search Report for EP Application No. 25183085.7, dated Nov. 6, 2025, pp. 1-9.

*Primary Examiner* — Nathaniel E Wiehe
*Assistant Examiner* — Theodore C Ribadeneyra
(74) *Attorney, Agent, or Firm* — CANTOR COLBURN LLP (57) ABSTRACT

A seal assembly of a shaft bearing system includes an inner seal element fixed to a shaft and rotatable therewith about a shaft axis, and an outer seal located radially outboard of the inner seal element and rotationally fixed relative to the shaft axis. The outer seal includes a first circumferential seal segment, and a second circumferential seal segment abutting the first circumferential seal segment at a seal joint. The first circumferential seal segment includes one or more circumferentially extending first segment fingers installed into one or more complimentary second segment pockets at least partially defining a tortuous pathway in an axial direction between the first seal segment and the second seal segment.

14 Claims, 9 Drawing Sheets

(56) References Cited

U.S. PATENT DOCUMENTS

| | | | |
|---|---|---|---|
| 2007/0085278 A1* | 4/2007 | Davis | F04D 29/124 277/411 |
| 2017/0248026 A1* | 8/2017 | De La Bruere Terreault | F16J 15/40 |
| 2018/0119557 A1* | 5/2018 | Amador | F04D 29/321 |
| 2018/0340439 A1* | 11/2018 | Vinski | F01D 25/16 |
| 2018/0347386 A1 | 12/2018 | Sellhorn et al. | |
| 2019/0293183 A1* | 9/2019 | Miller | F16J 15/441 |
| 2023/0016933 A1 | 1/2023 | Grimanis et al. | |

* cited by examiner

SERVICEABLE PROPELLER SHAFT ZERO AIR GAP SEAL

BACKGROUND

Exemplary embodiments pertain to the art of propeller shaft and bearing systems, and the sealing thereof.

In propeller-driven aircraft systems, the propeller is located on a propeller shaft, which is rotatable about a shaft axis. The propeller shaft is supported by one or more bearings, and seals are installed to prevent leakage of lubricant from the bearing. These seals however, tend to wear in operation and leak oil from the bearing which is unacceptable to customers and also creates environmental issues. The art would welcome better performing and serviceable sealing solutions for the propeller shaft and the associated bearing.

BRIEF DESCRIPTION

In one embodiment, a seal assembly of a shaft bearing system includes an inner seal element fixed to a shaft and rotatable therewith about a shaft axis, and an outer seal located radially outboard of the inner seal element and rotationally fixed relative to the shaft axis. The outer seal includes a first circumferential seal segment, and a second circumferential seal segment abutting the first circumferential seal segment at a seal joint. The first circumferential seal segment includes one or more circumferentially extending first segment fingers installed into one or more complimentary second segment pockets at least partially defining a tortuous pathway in an axial direction between the first seal segment and the second seal segment.

Additionally or alternatively, in this or other embodiments the second seal segment includes one or more circumferentially extending second segment fingers installed into one or more complimentary first segment pockets to at least partially define the tortuous pathway.

Additionally or alternatively, in this or other embodiments the outer seal is urged radially inwardly toward the inner seal element via one or more of air pressure, one or more O-rings, a self-energizing spring, or a W-seal acting at a radially outer surface of the outer seal.

Additionally or alternatively, in this or other embodiments the air pressure is provided via an airflow opening extending through the outer seal.

Additionally or alternatively, in this or other embodiments one or more radially-extending seal tabs of the outer seal are installed into complimentary seal notches in a fixed structure to circumferentially locate the outer seal.

Additionally or alternatively, in this or other embodiments a retaining ring is installed to the outer seal to axially retain the outer seal.

Additionally or alternatively, in this or other embodiments a Belvil washer is positioned between the retaining ring and the outer seal to axially load the outer seal.

Additionally or alternatively, in this or other embodiments the inner seal element includes a plurality of knife edges extending radially outwardly toward the outer seal.

In another exemplary embodiment, a bearing system for a shaft includes a bearing housing at least partially surrounding a shaft, a bearing including a plurality of bearing elements disposed in the bearing housing and supportive of the shaft, and a seal assembly to seal the bearing housing. The seal assembly includes an inner seal element fixed to the shaft and rotatable therewith about a shaft axis, and an outer seal located radially outboard of the inner seal element and rotationally fixed relative to the shaft axis. The outer seal includes a first circumferential seal segment, and a second circumferential seal segment abutting the first circumferential seal segment at a seal joint. The first circumferential seal segment includes one or more circumferentially extending first segment fingers installed into one or more complimentary second segment pockets at least partially defining a tortuous pathway in an axial direction between the first seal segment and the second seal segment.

Additionally or alternatively, in this or other embodiments the second seal segment includes one or more circumferentially extending second segment fingers installed into one or more complimentary first segment pockets to at least partially define the tortuous pathway.

Additionally or alternatively, in this or other embodiments the outer seal is urged radially inwardly toward the inner seal element via one or more of air pressure, one or more O-rings, a self-energizing spring, or a W-seal acting at a radially outer surface of the outer seal.

Additionally or alternatively, in this or other embodiments the air pressure is provided via an airflow opening extending through the outer seal.

Additionally or alternatively, in this or other embodiments one or more radially-extending seal tabs of the outer seal are installed into complimentary seal notches in the bearing housing to circumferentially locate the outer seal.

Additionally or alternatively, in this or other embodiments a retaining ring is installed to the outer seal to axially retain the outer seal.

Additionally or alternatively, in this or other embodiments a Belvil washer is positioned between the retaining ring and the outer seal to axially load the outer seal.

Additionally or alternatively, in this or other embodiments the inner seal element includes a plurality of knife edges extending radially outwardly toward the outer seal.

In yet another exemplary embodiment, a propeller assembly includes a propeller mounted on a propeller shaft and rotatable about a shaft axis, and a bearing system supportive of the propeller shaft including a bearing housing at least partially surrounding the propeller shaft, a bearing including a plurality of bearing elements positioned in the bearing housing and supportive of the propeller shaft, and a seal assembly to seal the bearing housing. The seal assembly includes an inner seal element fixed to the propeller shaft and rotatable therewith about a shaft axis, and an outer seal located radially outboard of the inner seal element and rotationally fixed relative to the shaft axis. The outer seal includes a first circumferential seal segment, and a second circumferential seal segment abutting the first circumferential seal segment at a seal joint. The first circumferential seal segment includes one or more circumferentially extending first segment fingers installed into one or more complimentary second segment pockets at least partially defining a tortuous pathway in an axial direction between the first seal segment and the second seal segment.

Additionally or alternatively, in this or other embodiments the second seal segment includes one or more circumferentially extending second segment fingers installed into one or more complimentary first segment pockets to at least partially define the tortuous pathway.

Additionally or alternatively, in this or other embodiments one or more radially-extending seal tabs of the outer seal are installed into complimentary seal notches in the bearing housing to circumferentially locate the outer seal.

Additionally or alternatively, in this or other embodiments a retaining ring is installed to the outer seal to axially retain the outer seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
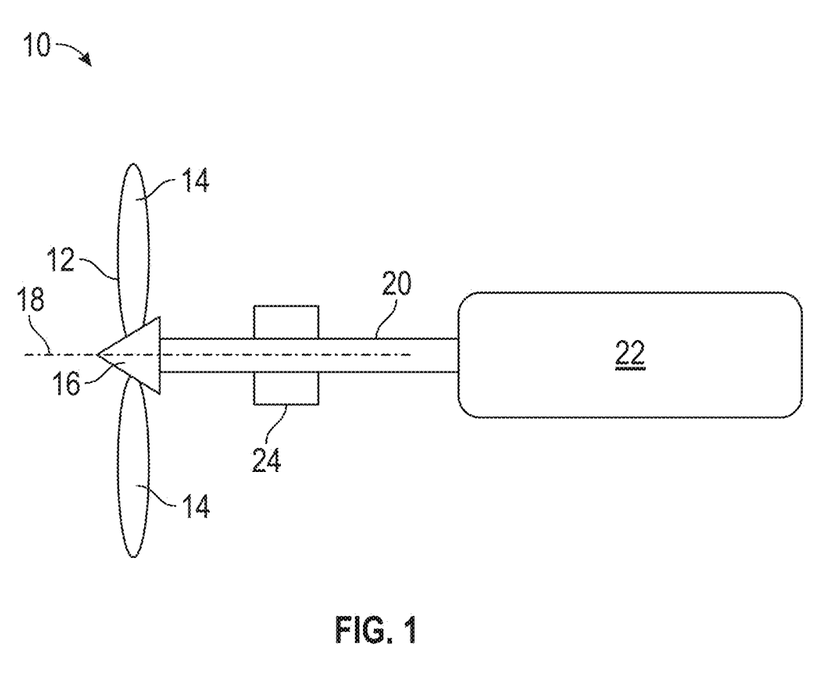
FIG. 1 is a schematic illustration of an embodiment of a propeller system.

Referring now to FIG. 1, an embodiment of a propeller system 10 of an aircraft is illustrated. The propeller system 10 includes a propeller 12 having a plurality of blades 14 extending radially from a propeller hub 16. The propeller 12 is driven to rotate about a propeller axis 18 by a propeller shaft 20 to which the propeller 12 is secured. The propeller shaft 20 is driven to rotate about the propeller axis 18 by an engine 22 operably connected to the propeller shaft 20. Additionally, the propeller shaft 20 is supported at the propeller axis 18 by a bearing system 24.

Figure 2:
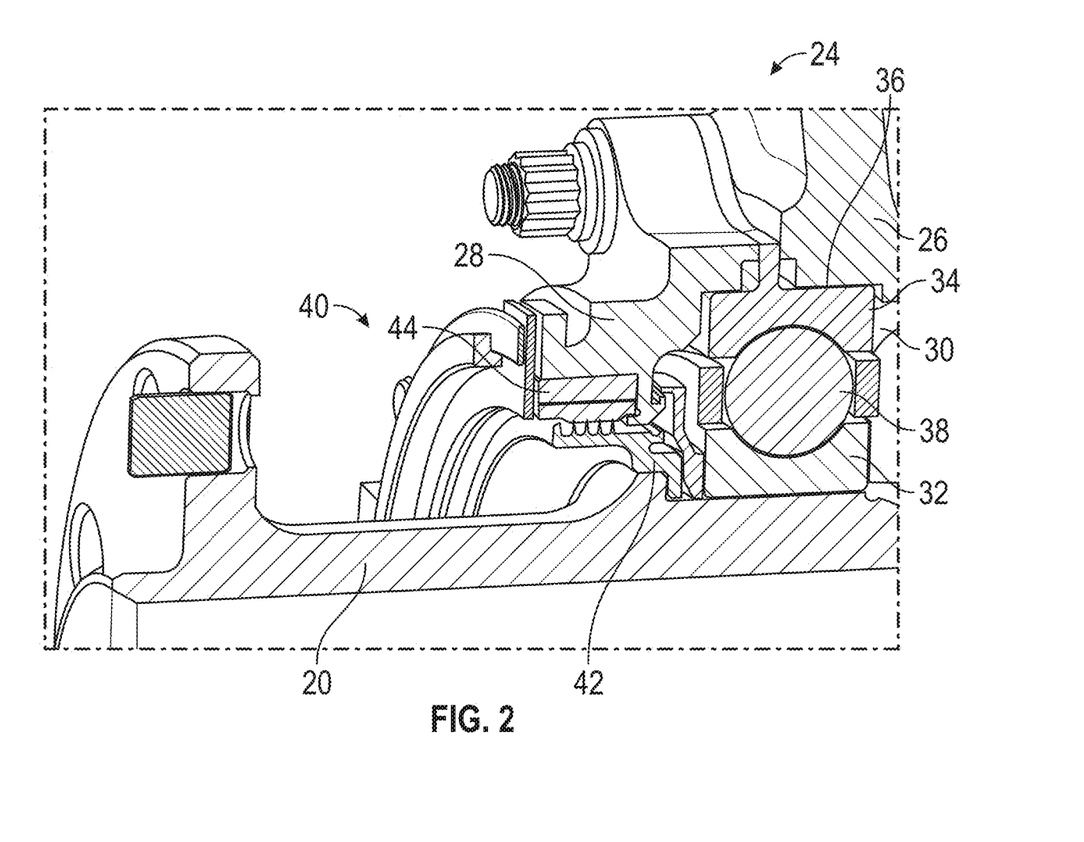
FIG. 2 is a schematic illustration of a bearing arrangement for a propeller shaft.

Referring now to FIG. 2, the bearing system 24 includes a housing 26 and a cover plate 28, which together define a bearing enclosure 30. A bearing inner race 32 is disposed at the propeller shaft 20 and rotates about the propeller axis 18 with the propeller shaft 20 and a bearing outer race 34 is disposed at an inner surface 36 of the bearing enclosure 30. A plurality of bearing elements 38 are located radially between the bearing inner race 32 and the bearing outer race 34.

Figure 3:
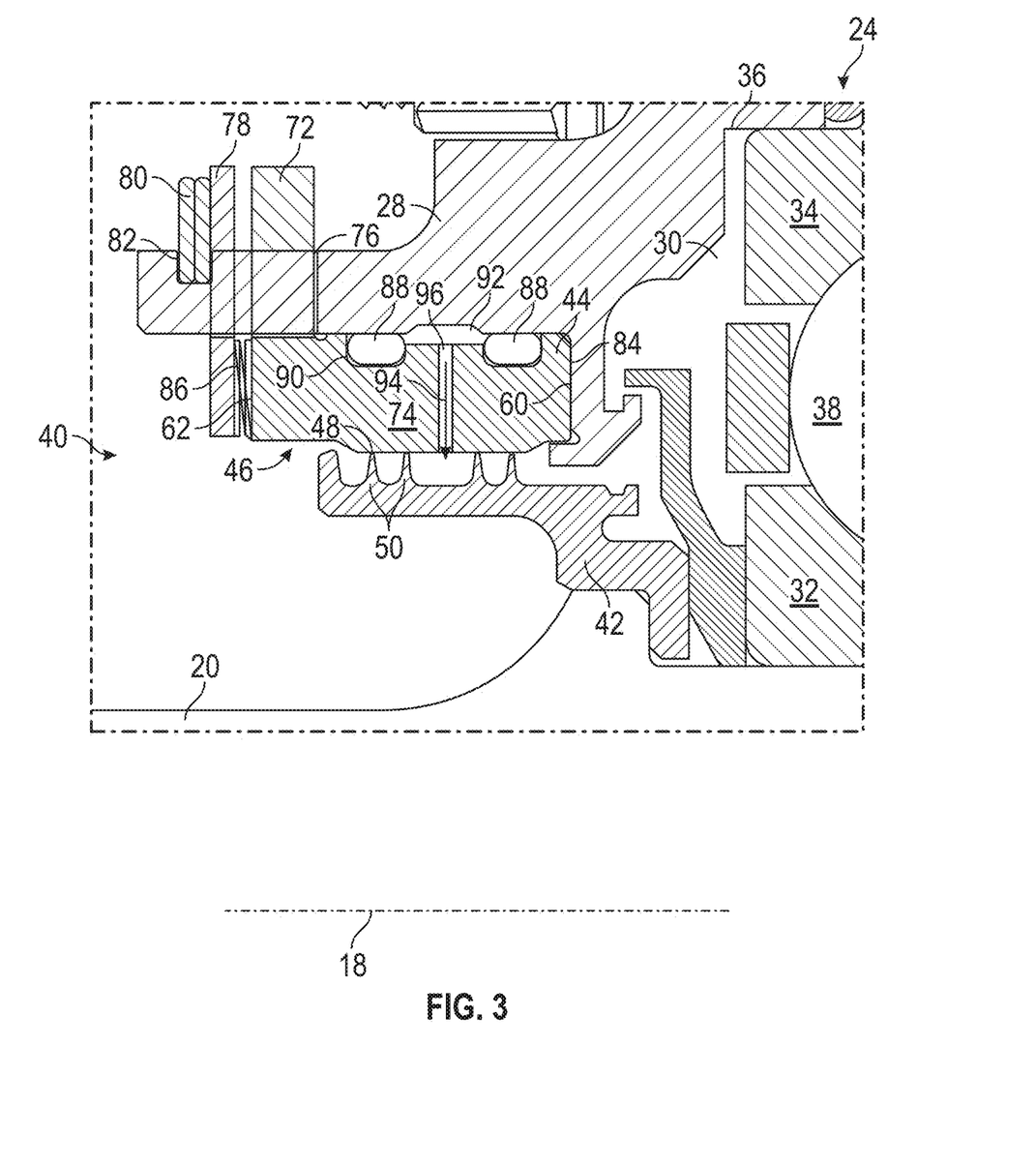
FIG. 3 is a cross-sectional view of an embodiment of a bearing seal assembly of a propeller shaft.

Referring to FIG. 3, a seal assembly 40 is installed to the bearing system 24 to prevent egress of bearing lubricant from the bearing enclosure 30 and to prevent ingress of air, dirt, or other contaminants into the bearing enclosure 30. The seal assembly includes a rotating inner seal element 42 installed to the propeller shaft 20 and rotatable about the propeller axis 18 therewith. Additionally, a rotationally fixed outer seal 44 is installed to the inner surface 36, in some embodiments to the cover plate 28. A seal interface 46 is defined between a radially inner surface 48 of the outer seal 44, and the inner seal element 42. In some embodiments, the inner seal element 42 is configured with a plurality of knife edges 50 that define the seal interface 46 with the radially inner surface 48. Additionally, in some embodiments the radially inner surface 48 is formed from an abradable material into which the plurality of knife edges 50 rub during operation.

Figure 4:
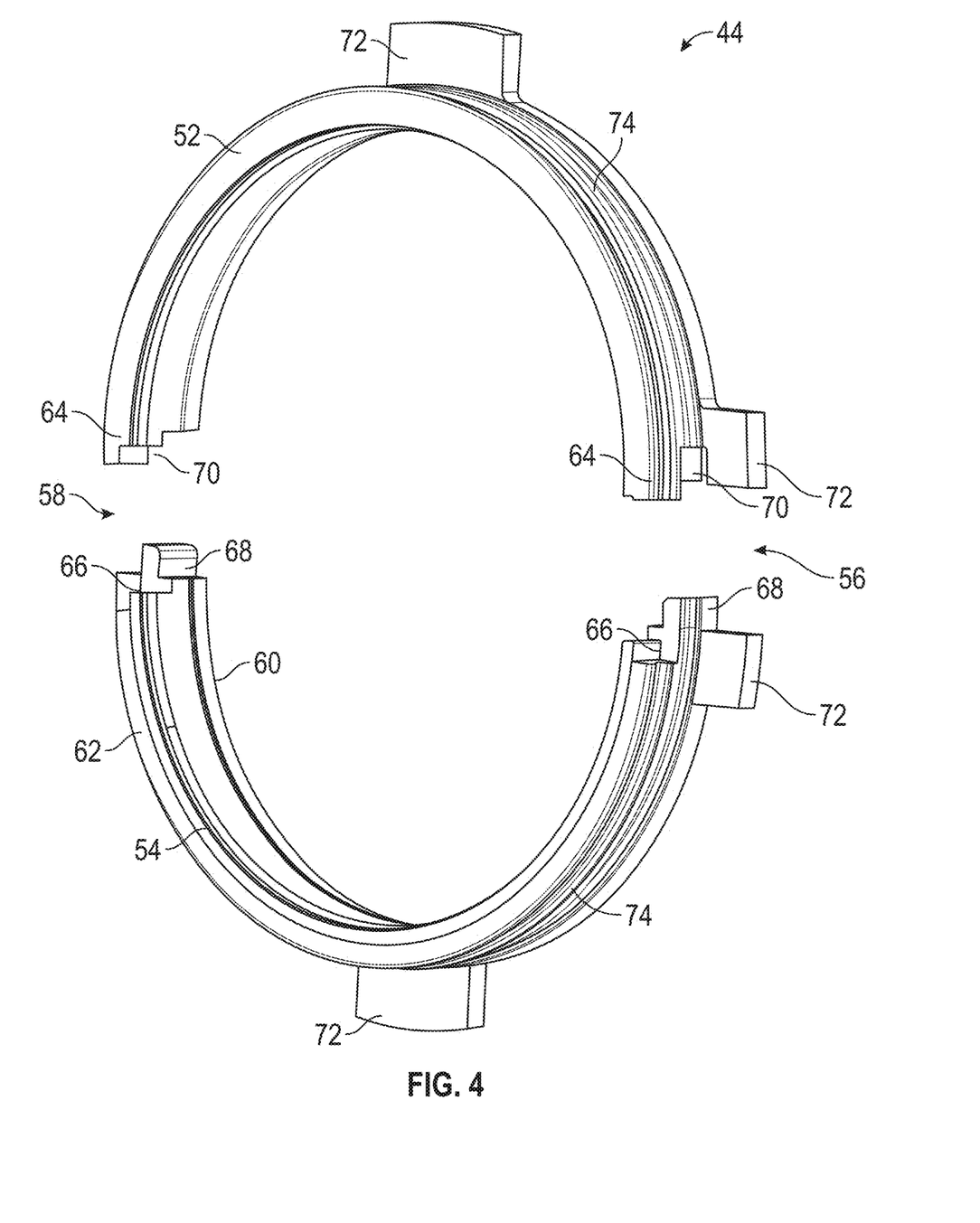
FIG. 4 is a disassembled view of an embodiment of a split outer seal of a bearing seal assembly.
Figure 5:
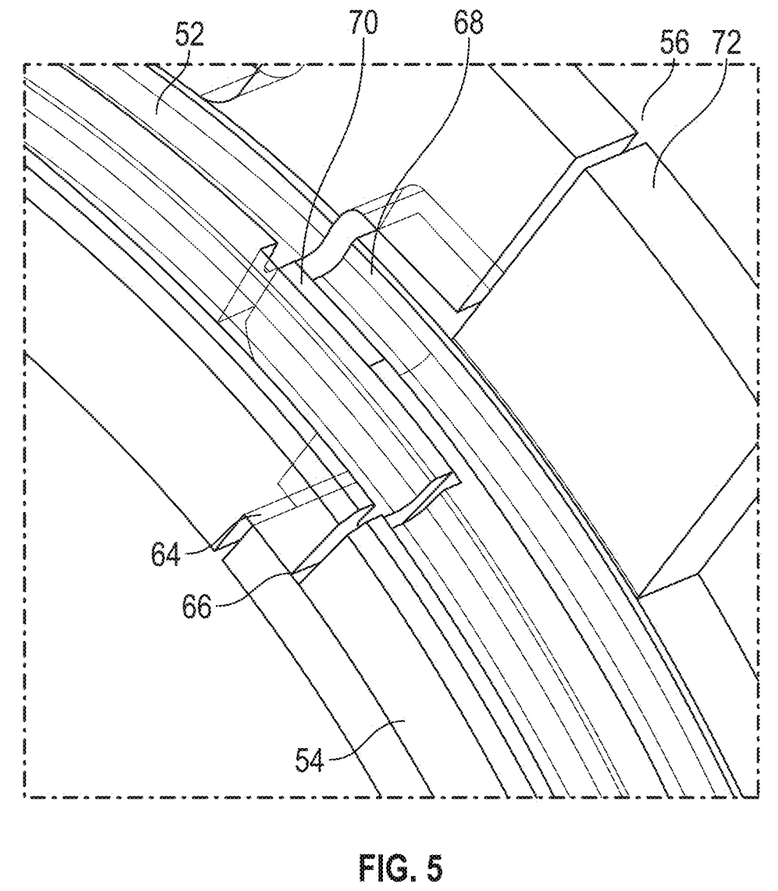
FIG. 5 is an illustration of an embodiment of a seal joint of a split outer seal.
Figure 6:
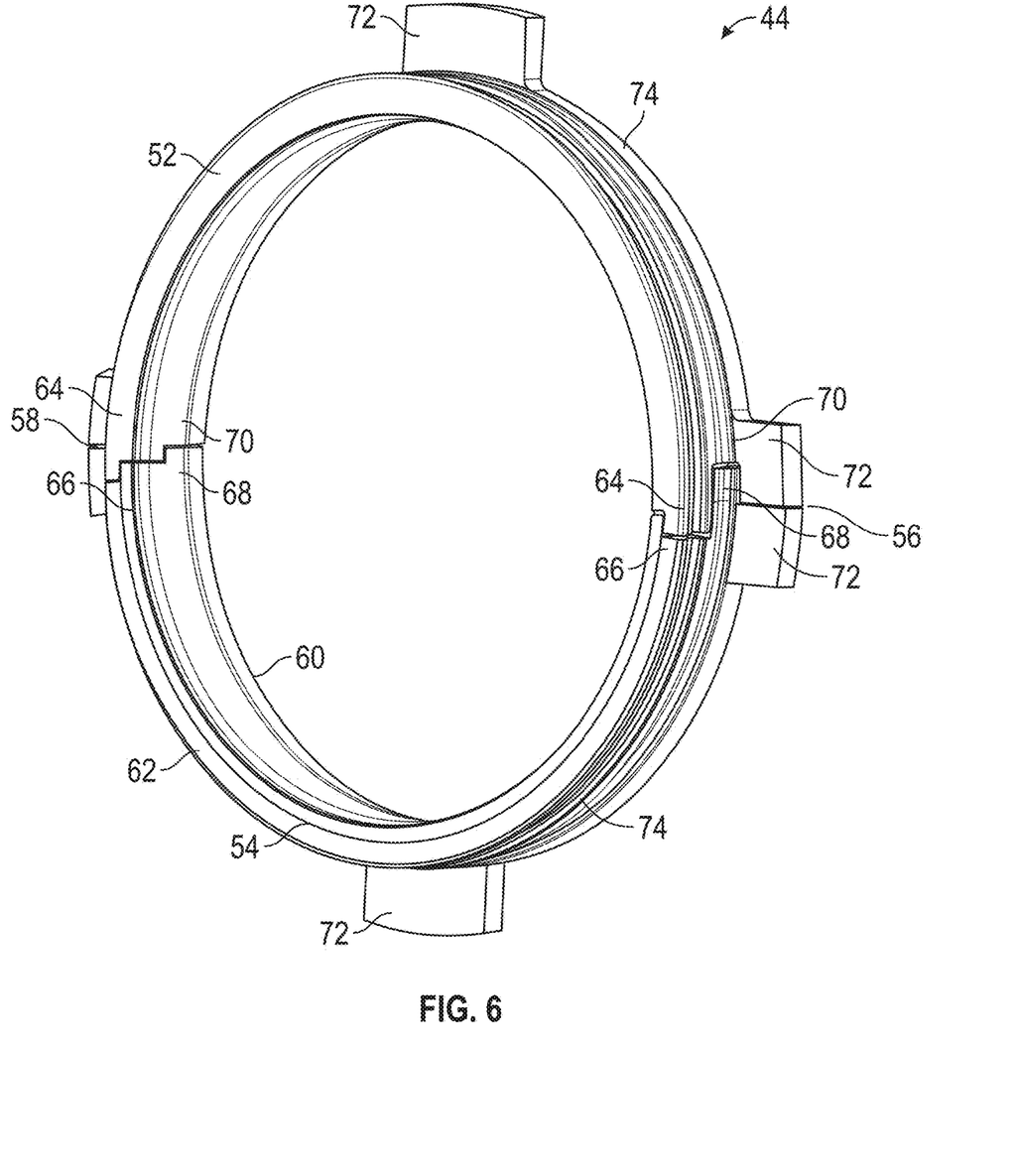
FIG. 6 is an assembled view of an embodiment of a split outer seal.

Referring to FIGS. 4-6 the outer seal 44 is circumferentially split into a first seal segment 52 and a second seal segment 54. The first seal segment 52 and the second seal segment 54 mate at first seal joint 56 and second seal joint 58. In some embodiments, the second seal joint 58 is located 180 degrees from the first seal joint 56 relative to the propeller axis 18. A tortuous path is defined axially and in some embodiments radially along the first seal joint 56 and the second seal joint 58 so that there is not a straight linear leakage path from a first axial seal end 60 to a second axial seal end 62 of the outer seal 44. This tortuous path reduces the occurrence of oil leakage from the bearing enclosure 30 and reduces the intrusion of air or other contaminants into the bearing enclosure 30.

The tortuous path may be achieved via localized circumferential and radial overlap of the first seal segment 52 and the second seal segment 54 at the first seal joint 56 and the second seal joint 58. In the embodiment illustrated, the first seal segment 52 includes one or more circumferentially-extending first segment fingers 64 that are installed into corresponding second segment pockets 66 of the adjacent second seal segment 54. Additionally, the second seal segment 54 includes one or more circumferentially-extending second segment fingers 68 that are installed into corresponding first segment pockets 70 of the adjacent first seal segment 52. In some embodiments, the first seal joint 56 includes at least one first segment finger 64 and one second segment finger 68, and the second seal joint 58 similarly includes at least one first segment finger 64 and one second segment finger 68. In such embodiments, the second segment finger 68 is axially offset from the first segment finger 64.

Referring again to FIG. 3, the outer seal 44 is circumferentially located in the cover plate 28 via a plurality of locating tabs 72 extending radially outwardly from a seal body 74 of each of the first seal segment 52 and the second seal segment 54. The locating tabs 72 are positioned into corresponding locating notches 76 defined in the cover plate 28. A retaining ring 78 is installed axially onto the seal body 74 and the locating tabs 72, and one or more key washers 80 are installed over the retaining ring 78 in a key washer opening 82 in the cover plate 28 to axially retain the outer seal 44 in the cover plate 28. In some embodiments, the outer seal 44 is axially loaded against a seal stop 84 of the housing 26 via a Belvil type washer 86 disposed between the outer seal 44 and the retaining ring 78.

O-rings 88 are installed at an outer seal surface 90 of the outer seal 44, between the outer seal 44 and the inner surface 36, defining an outer cavity 92. In some embodiments airflow 94 is injected into the outer cavity 92 via an air passage 96 in the outer seal 44 to pressurize the outer cavity 92 and urge the outer seal 44 radially inwardly toward the inner seal element 42, which improves the sealing therebetween.

Figure 7:
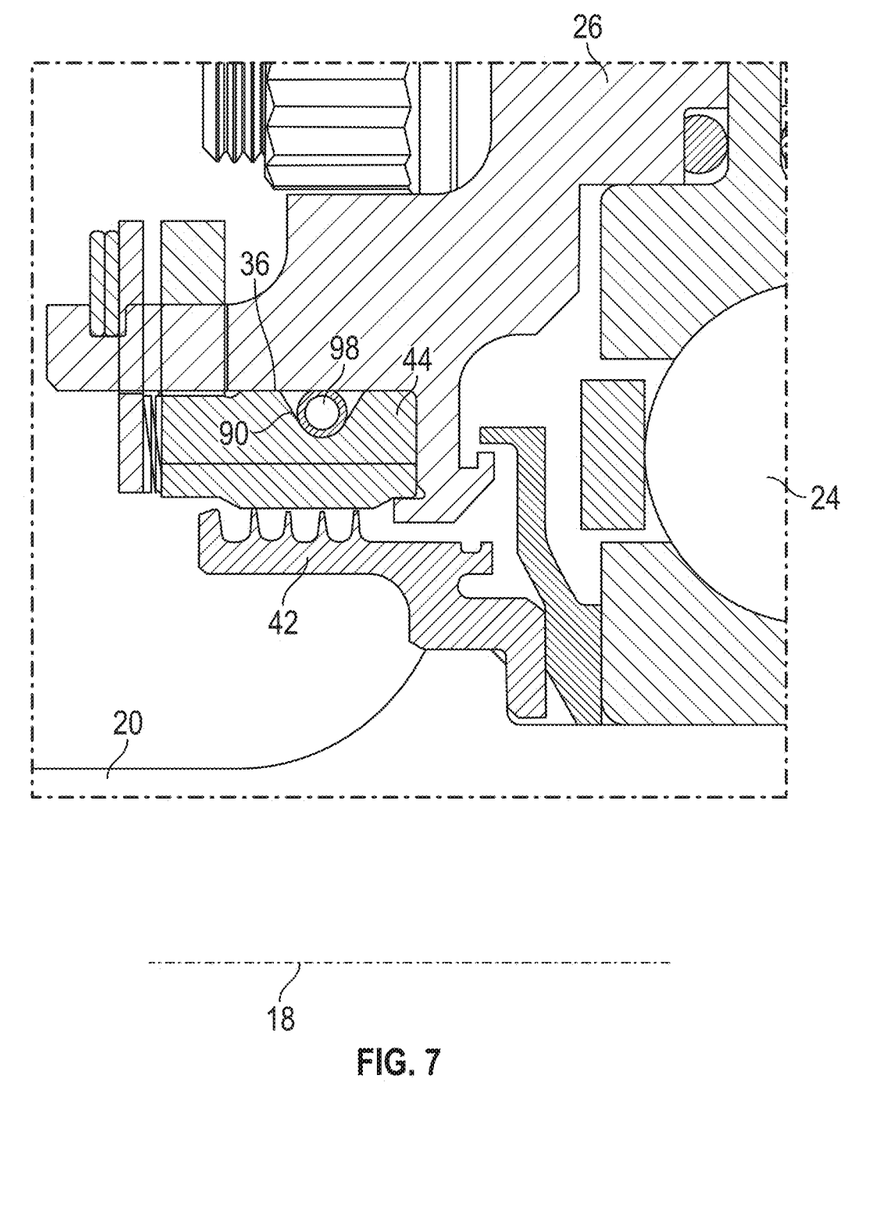
FIG. 7 is a cross-sectional view of another embodiment of a bearing seal assembly of a propeller shaft.
Figure 8:
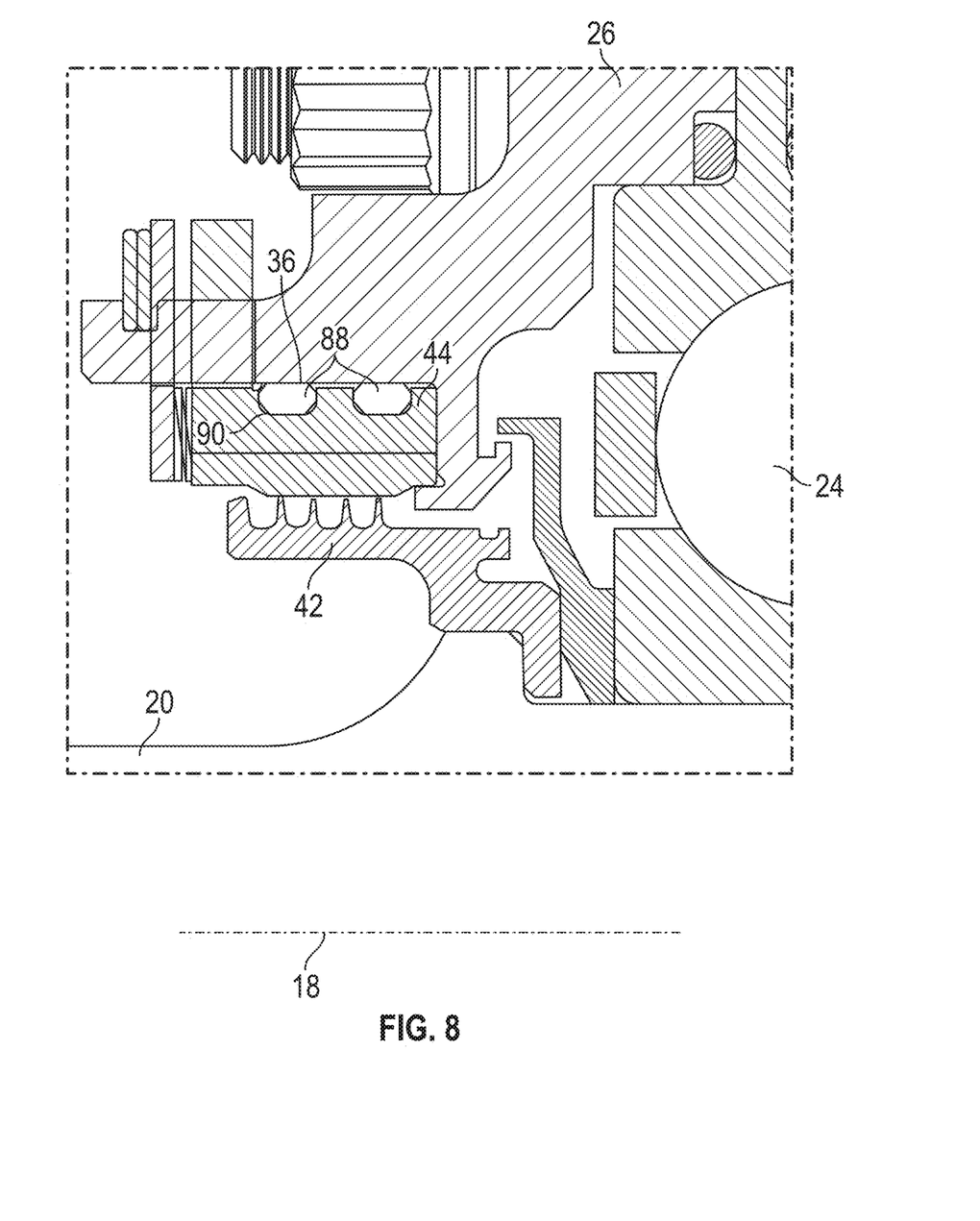
FIG. 8 is a cross-sectional view of yet another embodiment of a bearing seal assembly of a propeller shaft.
Figure 9:
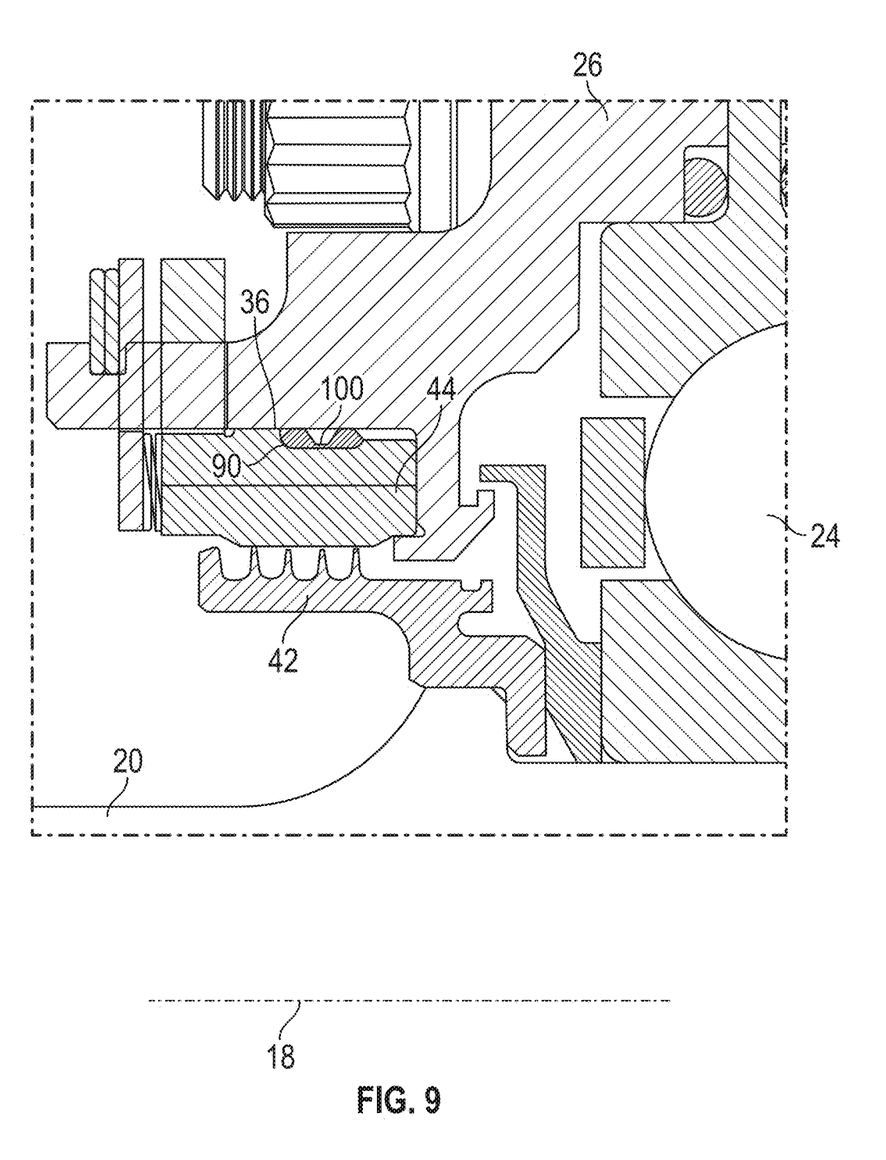
FIG. 9 is a cross-sectional view of still another embodiment of a bearing seal assembly of a propeller shaft.

In other embodiments, airflow 94 is not utilized to urge the outer seal 44 radially inwardly. In one embodiment, illustrated in FIG. 7, a self-energized spring 98 is installed to the outer seal surface 90, exerting a force on the inner surface 36 to urge the outer seal 44 radially inwardly toward the inner seal element 42. In another embodiment illustrated in FIG. 8, O-rings 88 are installed to the outer seal surface 90 to urge the outer seal 44 radially inwardly via a force exerted on the inner surface 36. In yet another embodiment, illustrated in FIG. 9, a metallic W-seal 100 is installed at the outer seal surface 90 to urge the outer seal 44 radially inwardly.

The circumferentially split configuration of the outer seal 44 allows for better serviceability of the outer seal 44 due to improved ease of removal, while the tortuous path at the seal joints 58 between the first seal segment 52 and the second seal segment 54 reduces the potential leakage path from the bearing enclosure 30, thereby improving performance and service life of the bearing system 24.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal assembly of a shaft bearing system, comprising:
   an inner seal element fixed to a shaft and rotatable therewith about a shaft axis;
   an outer seal located radially outboard of the inner seal element and rotationally fixed relative to the shaft axis, the outer seal including:
   a first circumferential seal segment; and
   a second circumferential seal segment abutting the first circumferential seal segment at a seal joint;
   wherein the first circumferential seal segment includes one or more circumferentially extending first segment fingers installed into one or more complimentary second segment pockets at least partially defining a tortuous pathway in an axial direction between the first circumferential seal segment and the second circumferential seal segment;
   wherein the outer seal is urged radially inwardly toward the inner seal element via air pressure acting at a radially outer surface of the outer seal; and
   wherein the air pressure is provided via an airflow opening extending through one of the first circumferential seal segment and the second circumferential seal segment.

2. The seal assembly of claim 1, wherein the second circumferential seal segment includes one or more circumferentially extending second segment fingers installed into one or more complimentary first segment pockets to at least partially define the tortuous pathway.

3. The seal assembly of claim 1, further comprising one or more radially-extending seal tabs of the outer seal installed into complimentary seal notches in a fixed structure to circumferentially locate the outer seal.

4. The seal assembly of claim 1, further comprising a retaining ring installed to the outer seal to axially retain the outer seal.

5. The seal assembly of claim 4, further comprising a Belleville washer disposed between the retaining ring and the outer seal to axially load the outer seal.

6. The seal assembly of claim 1, wherein the inner seal element includes a plurality of knife edges extending radially outwardly toward the outer seal.

7. A bearing system for a shaft, comprising:
   a bearing housing at least partially surrounding a shaft;
   a bearing including a plurality of bearing elements disposed in the bearing housing and supportive of the shaft; and a seal assembly to seal the bearing housing including:
   an inner seal element fixed to the shaft and rotatable therewith about a shaft axis;
   an outer seal located radially outboard of the inner seal element and rotationally fixed relative to the shaft axis, the outer seal including:
   a first circumferential seal segment; and
   a second circumferential seal segment abutting the first circumferential seal segment at a seal joint;
   wherein the first circumferential seal segment includes one or more circumferentially extending first segment fingers installed into one or more complimentary second segment pockets at least partially defining a tortuous pathway in an axial direction between the first circumferential seal segment and the second circumferential seal segment;
   wherein the outer seal is urged radially inwardly toward the inner seal element via air pressure acting at a radially outer surface of the outer seal; and
   wherein the air pressure is provided via an airflow opening extending through one of the first circumferential seal segment and the second circumferential seal segment.

8. The bearing system of claim 7, wherein the second circumferential seal segment includes one or more circumferentially extending second segment fingers installed into one or more complimentary first segment pockets to at least partially define the tortuous pathway.

9. The bearing system of claim 7, further comprising a retaining ring installed to the outer seal to axially retain the outer seal.

10. The bearing system of claim 9, further comprising a Belleville washer disposed between the retaining ring and the outer seal to axially load the outer seal.

11. The bearing system of claim 7, wherein the inner seal element includes a plurality of knife edges extending radially outwardly toward the outer seal.

12. A propeller assembly, comprising:
   a propeller mounted on a propeller shaft and rotatable about a shaft axis; and
   a bearing system supportive of the propeller shaft, including:
   a bearing housing at least partially surrounding the propeller shaft;
   a bearing including a plurality of bearing elements disposed in the bearing housing and supportive of the propeller shaft; and a seal assembly to seal the bearing housing including:

an inner seal element fixed to the propeller shaft and rotatable therewith about a shaft axis;

an outer seal located radially outboard of the inner seal element and rotationally fixed relative to the shaft axis, the outer seal including:

a first circumferential seal segment; and a second circumferential seal segment abutting the first circumferential seal segment at a seal joint;

wherein the first circumferential seal segment includes one or more circumferentially extending first segment fingers installed into one or more complimentary second segment pockets at least partially defining a tortuous pathway in an axial direction between the first circumferential seal segment and the second circumferential seal segment;

wherein the outer seal is urged radially inwardly toward the inner seal element via air pressure acting at a radially outer surface of the outer seal; and wherein the air pressure is provided via an airflow opening extending through one of the first circumferential seal segment and the second circumferential seal segment.

13. The propeller assembly of claim 12, wherein the second circumferential seal segment includes one or more circumferentially extending second segment fingers installed into one or more complimentary first segment pockets to at least partially define the tortuous pathway.

14. The propeller assembly of claim 12, further comprising a retaining ring installed to the outer seal to axially retain the outer seal.

\* \* \* \* \*